(12) United States Patent
Boyarski

(10) Patent No.: US 8,690,114 B2
(45) Date of Patent: Apr. 8, 2014

(54) ADJUSTABLE SUSPENSION SYSTEM FOR OFF-ROAD VEHICLE

(75) Inventor: Jesse C. Boyarski, Richland Center, WI (US)

(73) Assignee: Seats, Inc., Reedsburg, WI (US)

(*) Notice: Subject to any disclaimer, the term of this patent is extended or adjusted under 35 U.S.C. 154(b) by 147 days.

(21) Appl. No.: 13/445,784

(22) Filed: Apr. 12, 2012

(65) Prior Publication Data

US 2013/0270410 A1    Oct. 17, 2013

(51) Int. Cl.
*F16M 13/00*    (2006.01)

(52) U.S. Cl.
USPC ........... 248/576; 248/587; 248/588; 248/421; 267/131; 297/344.15

(58) Field of Classification Search
USPC ......... 248/560, 575, 576, 581, 584, 587, 588, 248/592, 421; 297/344.15; 267/131
See application file for complete search history.

(56) References Cited

U.S. PATENT DOCUMENTS

| | | | |
|---|---|---|---|
| 2,401,748 A | 6/1946 | Dillon | |
| 2,637,369 A | 5/1953 | Demarest et al. | |
| 2,701,693 A | 2/1955 | Nordmark et al. | |
| 2,986,199 A * | 5/1961 | Ferreira et al. | 248/564 |
| 3,059,966 A | 10/1962 | Spielman | |
| 3,086,742 A | 4/1963 | Severson | |
| 3,338,632 A | 8/1967 | Kleinsorge | |
| 3,525,490 A | 8/1970 | Duncan et al. | |
| 3,560,049 A | 2/1971 | Burton | |
| 3,561,703 A | 2/1971 | Stencel | |
| 3,581,620 A | 6/1971 | Hauck et al. | |
| 3,599,232 A | 8/1971 | Tabor | |
| 3,628,634 A | 12/1971 | Valukonis | |
| 3,655,968 A | 4/1972 | Moore et al. | |
| 3,762,505 A | 10/1973 | Morse | |
| 3,779,591 A | 12/1973 | Rands | |
| 3,788,697 A | 1/1974 | Barton et al. | |
| 3,826,457 A * | 7/1974 | Huot de Longchamp | 248/564 |
| 3,874,626 A | 4/1975 | Gross et al. | |
| 3,913,707 A | 10/1975 | Wastenson et al. | |
| 3,913,975 A | 10/1975 | Carter | |
| 3,985,388 A | 10/1976 | Hogan | |

(Continued)

FOREIGN PATENT DOCUMENTS

EP    0078479    5/1983

OTHER PUBLICATIONS

Autoflug GmbH, Safety Seat System, Imdex Asia 2009, available online at: <http://www.defense-update.com/products/a/autoflug.htm>, Singapore Expo, May 12-14, 2009.

(Continued)

*Primary Examiner* — Bradley Duckworth

(74) *Attorney, Agent, or Firm* — Michael Best & Friedrich LLP

(57) ABSTRACT

A support assembly includes a first support frame having a first bearing surface, and a second support frame spaced a vertical distance from the first support frame. A biasing member is connected to the first support frame and includes a first end and a second end. The first end bears against the first bearing surface. An adjustment assembly is connected to the second support frame and is adjustable with respect to the second support frame. The second end of the biasing member bears against the adjustment assembly.

20 Claims, 9 Drawing Sheets

(56) References Cited

U.S. PATENT DOCUMENTS

| | | | |
|---|---|---|---|
| 4,029,283 A | 6/1977 | Swenson et al. | |
| 4,047,759 A | 9/1977 | Koscinski | |
| 4,072,287 A | 2/1978 | Swenson et al. | |
| 4,128,217 A | 12/1978 | Mazelsky | |
| 4,150,805 A | 4/1979 | Mazelsky | |
| 4,241,894 A | 12/1980 | Okuyama | |
| 4,312,491 A * | 1/1982 | Aondetto | 248/575 |
| 4,358,154 A | 11/1982 | Campbell | |
| 4,359,200 A | 11/1982 | Brevard et al. | |
| 4,397,440 A | 8/1983 | Hall et al. | |
| 4,408,738 A | 10/1983 | Mazelsky | |
| 4,423,848 A | 1/1984 | Mazelsky | |
| 4,448,386 A | 5/1984 | Moorhouse et al. | |
| 4,492,408 A | 1/1985 | Lohr | |
| 4,523,730 A | 6/1985 | Martin | |
| 4,525,010 A | 6/1985 | Trickey et al. | |
| 4,603,907 A | 8/1986 | Witzke | |
| 4,714,227 A | 12/1987 | Holm et al. | |
| 4,729,539 A | 3/1988 | Nagata | |
| 4,822,094 A | 4/1989 | Oldfather et al. | |
| 4,852,849 A | 8/1989 | Jones | |
| 4,856,763 A | 8/1989 | Brodersen et al. | |
| 4,943,037 A * | 7/1990 | Brodersen et al. | 267/131 |
| 4,997,233 A | 3/1991 | Sharon | |
| 5,116,016 A * | 5/1992 | Nagata | 248/578 |
| 5,125,598 A | 6/1992 | Fox | |
| 5,125,631 A * | 6/1992 | Brodersen et al. | 267/131 |
| 5,222,709 A * | 6/1993 | Culley et al. | 248/421 |
| 5,222,915 A | 6/1993 | Petrzelka et al. | |
| 5,253,924 A | 10/1993 | Glance | |
| 5,273,240 A | 12/1993 | Sharon | |
| 5,338,091 A | 8/1994 | Miller | |
| 5,364,060 A | 11/1994 | Donovan et al. | |
| 5,439,271 A | 8/1995 | Ryan | |
| 5,487,562 A | 1/1996 | Hedderly et al. | |
| 5,542,638 A | 8/1996 | Smith | |
| 5,558,301 A | 9/1996 | Kerdoncuff et al. | |
| 5,601,338 A | 2/1997 | Wahls | |
| 5,651,585 A | 7/1997 | Van Duser | |
| 5,676,336 A | 10/1997 | Nefy et al. | |
| 5,692,705 A | 12/1997 | Bellais | |
| 5,743,591 A | 4/1998 | Tame | |
| 5,758,859 A | 6/1998 | Gonzalez | |
| 5,794,911 A | 8/1998 | Hill | |
| 5,842,669 A | 12/1998 | Ruff | |
| 5,927,679 A | 7/1999 | Hill | |
| 5,984,410 A | 11/1999 | Brodersen | |
| 6,152,534 A | 11/2000 | Maeda et al. | |
| 6,186,467 B1 | 2/2001 | Wahls | |
| 6,237,889 B1 | 5/2001 | Bischoff | |
| 6,299,252 B1 | 10/2001 | Frohnhaus et al. | |
| 6,347,778 B1 | 2/2002 | Koga et al. | |
| 6,357,729 B1 | 3/2002 | Takata | |
| 6,361,117 B1 | 3/2002 | Tate | |
| 6,378,939 B1 | 4/2002 | Knoll et al. | |
| 6,394,393 B1 | 5/2002 | Mort | |
| 6,409,243 B1 | 6/2002 | Hansen | |
| 6,585,190 B2 | 7/2003 | Mort | |
| 6,644,737 B2 | 11/2003 | Kohl et al. | |
| 6,773,049 B2 | 8/2004 | Rupiper et al. | |
| 6,776,384 B2 | 8/2004 | Igarashi | |
| 6,820,931 B2 | 11/2004 | Ruff et al. | |
| 6,866,236 B2 * | 3/2005 | Mullinix et al. | 248/421 |
| 6,913,314 B2 | 7/2005 | Hansen | |
| 6,935,693 B2 | 8/2005 | Janscha et al. | |
| 7,032,874 B2 | 4/2006 | Meyers et al. | |
| 7,063,382 B2 | 6/2006 | Ali et al. | |
| 7,070,236 B2 | 7/2006 | Kawashima | |
| 7,134,713 B1 | 11/2006 | Tseng | |
| 7,134,721 B2 | 11/2006 | Robinson | |
| 7,147,287 B2 | 12/2006 | Kuivala | |
| 7,152,839 B2 * | 12/2006 | Mullinix et al. | 248/421 |
| 7,168,671 B2 | 1/2007 | Bostrom et al. | |
| 7,185,867 B2 | 3/2007 | Hill et al. | |
| 7,246,836 B2 | 7/2007 | Hahn | |
| 7,314,249 B2 | 1/2008 | Becker et al. | |
| 7,393,030 B2 | 7/2008 | Steeg et al. | |
| 7,445,181 B2 | 11/2008 | Knoll et al. | |
| 7,484,781 B1 | 2/2009 | Garber et al. | |
| 7,744,155 B2 | 6/2010 | List et al. | |
| 7,819,469 B2 | 10/2010 | Stevens | |
| 8,016,258 B1 | 9/2011 | Boyarski et al. | |
| 8,561,748 B1 * | 10/2013 | Hahn et al. | 180/326 |
| 8,567,770 B2 * | 10/2013 | Fujita et al. | 267/131 |
| 2010/0102602 A1 | 4/2010 | Hansen | |
| 2010/0117408 A1 | 5/2010 | Hansen | |
| 2010/0207433 A1 | 8/2010 | Hahn | |

OTHER PUBLICATIONS

Industrial Seats, Division of United Group, Air Suspension Kit for Freightliner, M2 Medium Duty Trucks, 2002 & Up, available online at: <http://www.industrialseats.com/product.asp?pgrID=86&categoryID=23&pID=239>, published prior to Jul. 6, 2004.

National Seating, published prior to Jul. 6, 2004.

Federal Motor Vehicle Safety Standards (FMVSS), 49 CFR Ch. V (Oct. 1, 2005 Edition), Sections 571.207 and 571.210, USA. Standards predate Jul. 6, 2004.

The Society of Automotive Engineers, Inc. (SAE), Surface Vehicle Recommended Practice, Issued Apr. 1999, pp. 1-11, J2287, Society of Automotive Engineers, Inc., Copyright 1999, USA.

The C.E. White Co., New! Drivers Safety Seat, Model ISH-2002, The C.E. White Co., 2003, New Washington, Ohio, USA.

Kubota Corporation, photographs of an adjustable seat suspension assembly, publicly disclosed prior to Nov. 21, 2002.

Milsco Manufacturing Company, promotional material of an adjustable seat suspension assembly, published prior to Nov. 21, 2002.

Seats Incorporated, drawings of an adjustable seat suspension assembly, publicly disclosed prior to Nov. 21, 2002.

* cited by examiner

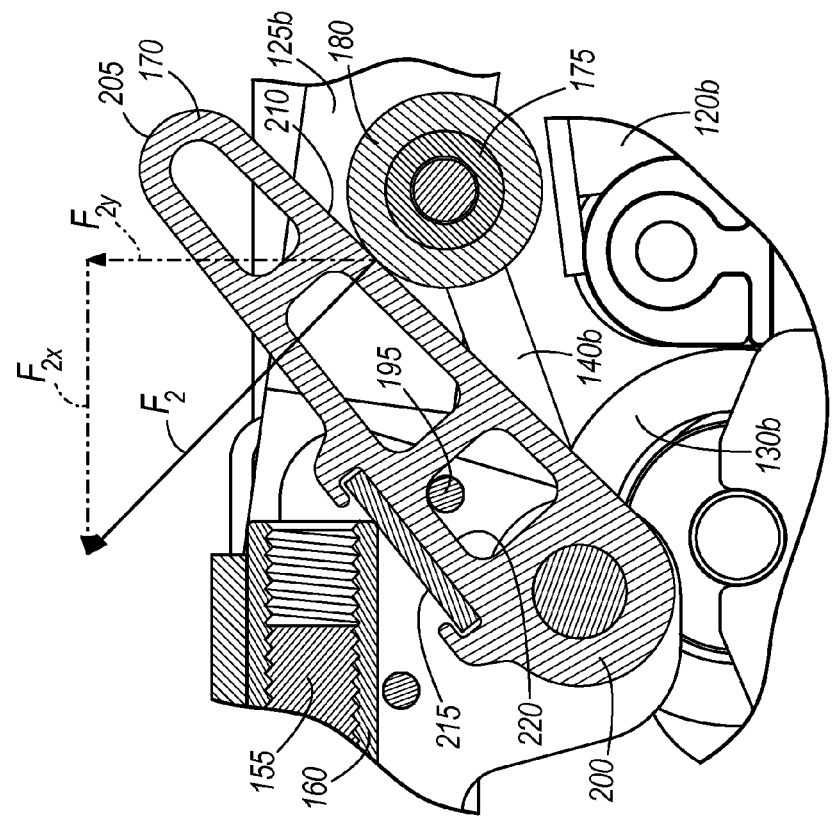
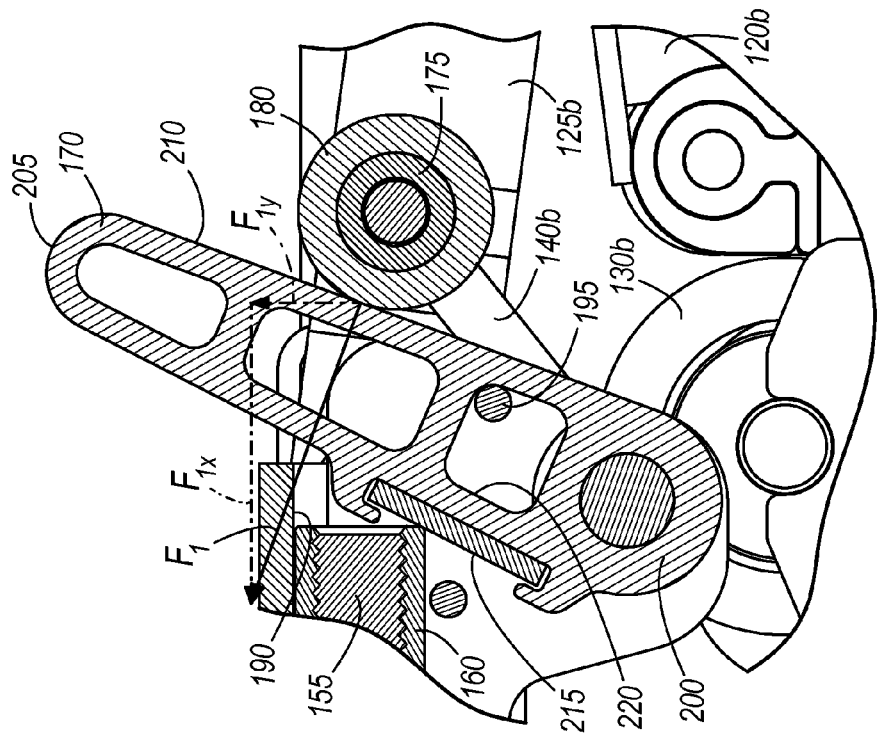

ADJUSTABLE SUSPENSION SYSTEM FOR OFF-ROAD VEHICLE

BACKGROUND

The present invention relates to off-road vehicles and suspension systems for a seat assembly in off-road vehicles.

SUMMARY

In one embodiment, the invention provides a support assembly including a first support frame having a first bearing surface, a second support frame spaced a vertical distance from the first support frame and a suspension having a plurality of suspension arms connected at a first end to the first support frame and connected at a second end to the second support frame. A biasing member is connected to the first support frame and has a first end and a second end, and the first end bears against the first bearing surface. A lever is connected to the second support frame at a lever first end, and pivots with respect to the second support frame. The lever has a second bearing surface, and the second end of the biasing member bears against the second bearing surface. A user actuable control is connected to the lever to adjust the angle of the lever with respect to horizontal upon actuation of the user actuable control. The second end of the biasing member moves along the second bearing surface as the first support frame moves with respect to the second support frame. The lever pivots between a first position in which the lever is at a first angle with respect to horizontal, and a second position in which the lever is at a second angle with respect to horizontal. When the lever is in the first position, the first end of the biasing member moves along the lever at the first angle with respect to horizontal between a first upper position and a first lower position. The first upper position is spaced a first horizontal distance and a first vertical distance away from the first lower position, and the biasing member is deflected a first distance between the first upper position and the first lower position. When the lever is in the second position, the first end of the biasing member moves along the lever at the second angle with respect to horizontal between a second upper position and a second lower position. The second upper position is spaced a second horizontal distance and a second vertical distance away from the second lower position, and the biasing member is deflected a second distance between the second upper position and the second lower position. The first angle is greater than the second angle and the second deflection is greater than the first deflection.

In another embodiment, the invention provides a support assembly includes a first support frame having a first bearing surface, and a second support frame spaced a vertical distance from the first support frame. A biasing member is connected to the first support frame and includes a first end and a second end. The first end bears against the first bearing surface. An adjustment assembly is connected to the second support frame and is adjustable with respect to the second support frame. The second end of the biasing member bears against the adjustment assembly.

Other aspects of the invention will become apparent by consideration of the detailed description and accompanying drawings.

BRIEF DESCRIPTION OF THE DRAWINGS

FIG. 9 is a close-up view of a portion of FIG. 7.

FIG. 10 is a close-up view of a portion of FIG. 8.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
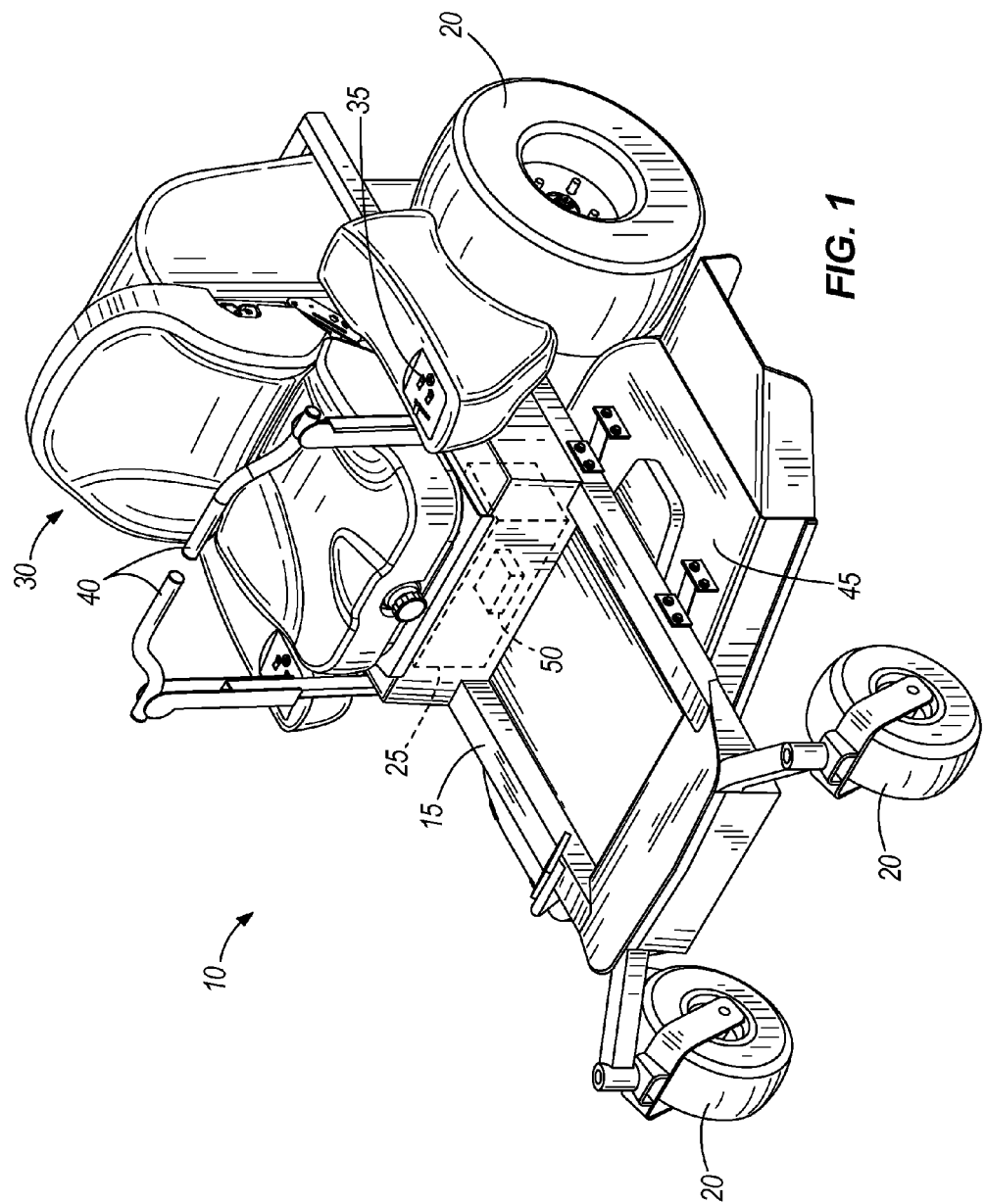
FIG. 1 is a perspective view of an off-highway vehicle including a seat assembly according to the present invention.

FIG. 1 illustrates an off-highway vehicle 10 that includes a chassis 15, wheels 20 supporting the chassis 15, an internal combustion engine 25 mounted to the chassis 15, a seat 30 mounted to the chassis 15, a control panel 35, control levers 40, and a mower deck 45. An operator zone of the vehicle 10 includes the seat 30 and controls and components within reach of an operator seated in the seat 30 (e.g., the control panel 35 and the control levers 40). One suitable off-highway vehicle is commonly referred to as a zero-turn radius lawn mower, but the invention may be embodied in other types of off-highway vehicles and other vehicles intended for road use; the invention is not limited to the application illustrated.

In the illustrated embodiment, the engine 25 includes an ignition system 50 that provides a spark or other event that drives combustion within the internal combustion engine 25. Although the engine 25 in the illustrated embodiment is of the internal combustion variety, the invention is applicable to any type of engine, and the term "ignition system," as applied to this invention, refers to the part of the engine that sustains its continued operation. In this regard, the ignition system 50 may be termed an ignition circuit that permits operation of the engine 25 when closed and disables operation of the engine 25 when open. Although the illustrated embodiment includes an internal combustion engine 25, the present invention may be applied to vehicles and systems having alternative prime movers, such as batteries or other energy storage devices, fuel cells, or gas/electric hybrid drive systems. In such other embodiments, the ignition system would include the electric circuit that enables and disables the prime mover to operate or that enables and disables the vehicle drive and implement systems to operate under the influence of the prime mover.

In the illustrated embodiment, the engine 25 drives rotation of at least one of the wheels 20 through a transmission (e.g., a hydraulic, electric, or mechanical transmission). The operator independently controls speed and direction of rotation of the left and right side wheels 20 via the control levers 40. In some embodiments, the engine 25 also selectively drives rotation of one or more cutting blades under the mower deck 45 to cut vegetation over which the vehicle 10 travels.

Figure 2:
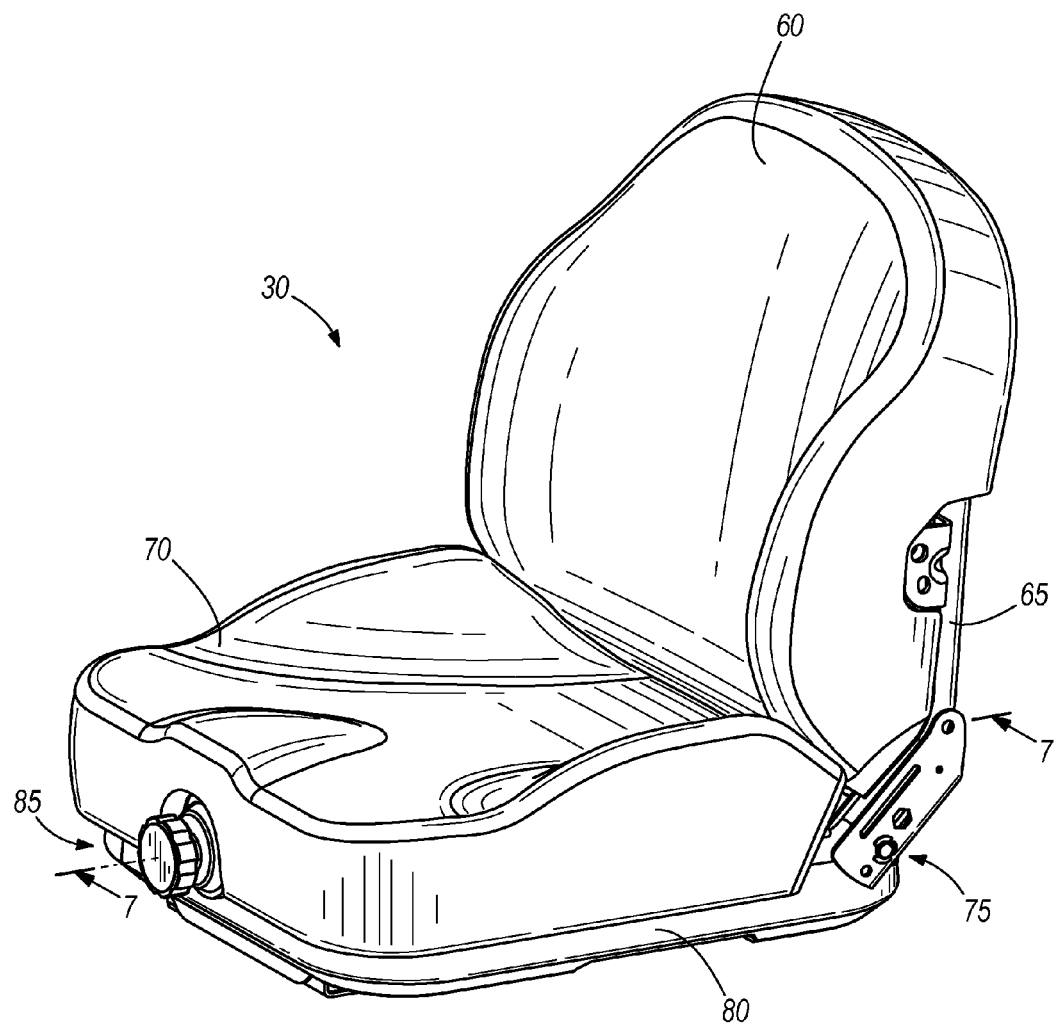
FIG. 2 is a perspective view of the seat assembly.

With reference to FIG. 2, the seat 30 includes a back cushion 60, a back frame 65, a bottom cushion 70, a bottom frame assembly 75, a flexible bellows 80, and an adjustment assembly 85. The seat 30 accommodates an operator of the vehicle 10. The back frame 65 supports the back cushion 60, and the bottom frame assembly 75 supports the bottom cushion 70. The flexible bellows 80 substantially encloses the bottom frame assembly 75 and adjustment assembly 85, while accommodating movement of the bottom frame assembly 75.

Figure 3:
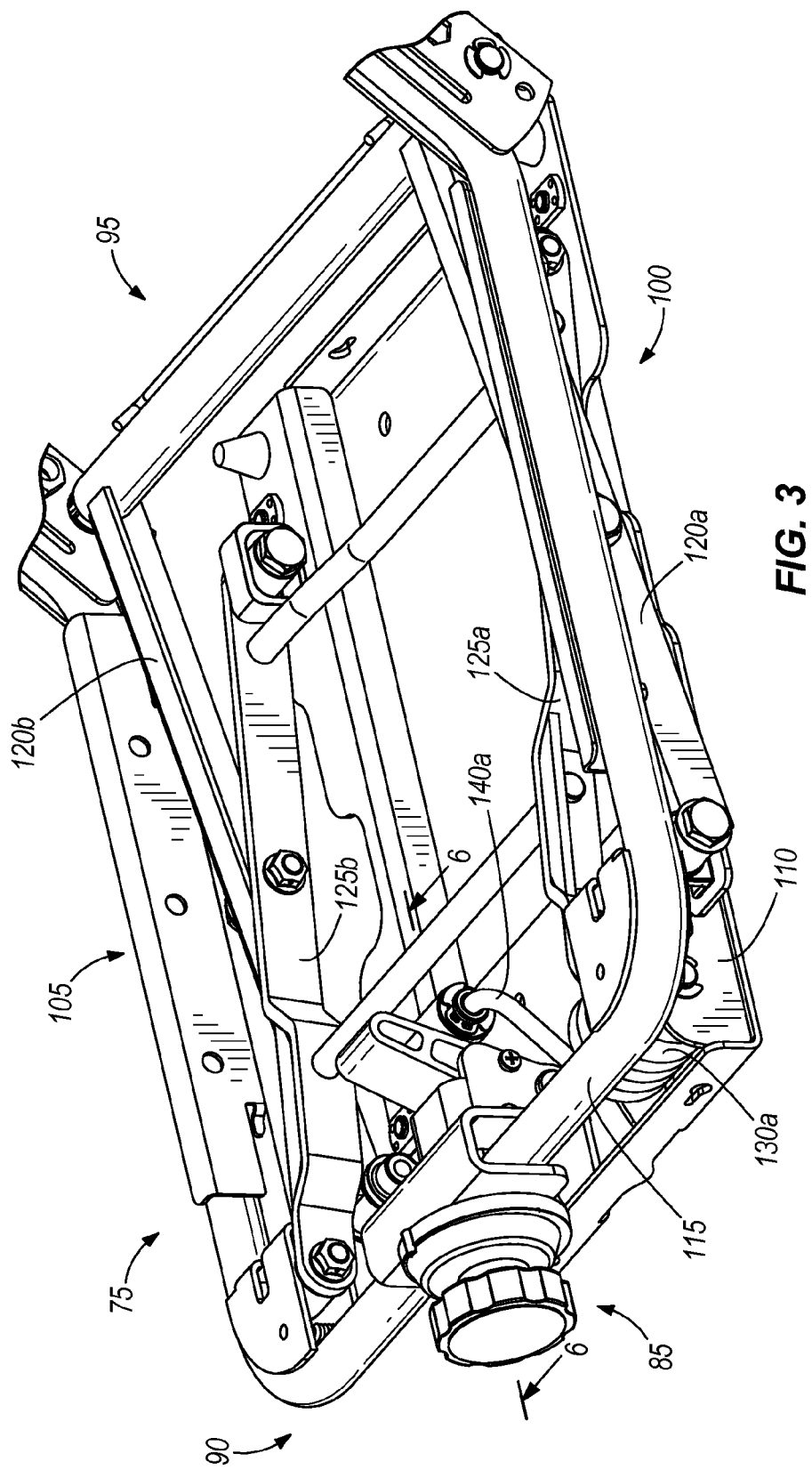
FIG. 3 is a perspective view of a bottom frame of the seat assembly.
Figure 4:
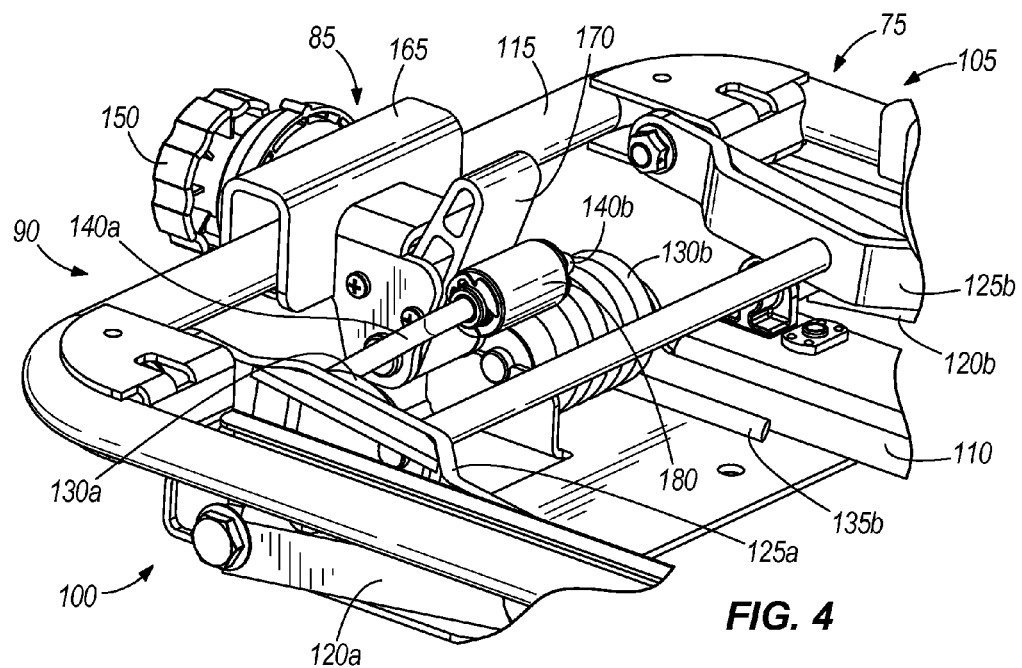
FIG. 4 is a first side perspective view of an adjustment mechanism for the seat assembly.
Figure 5:
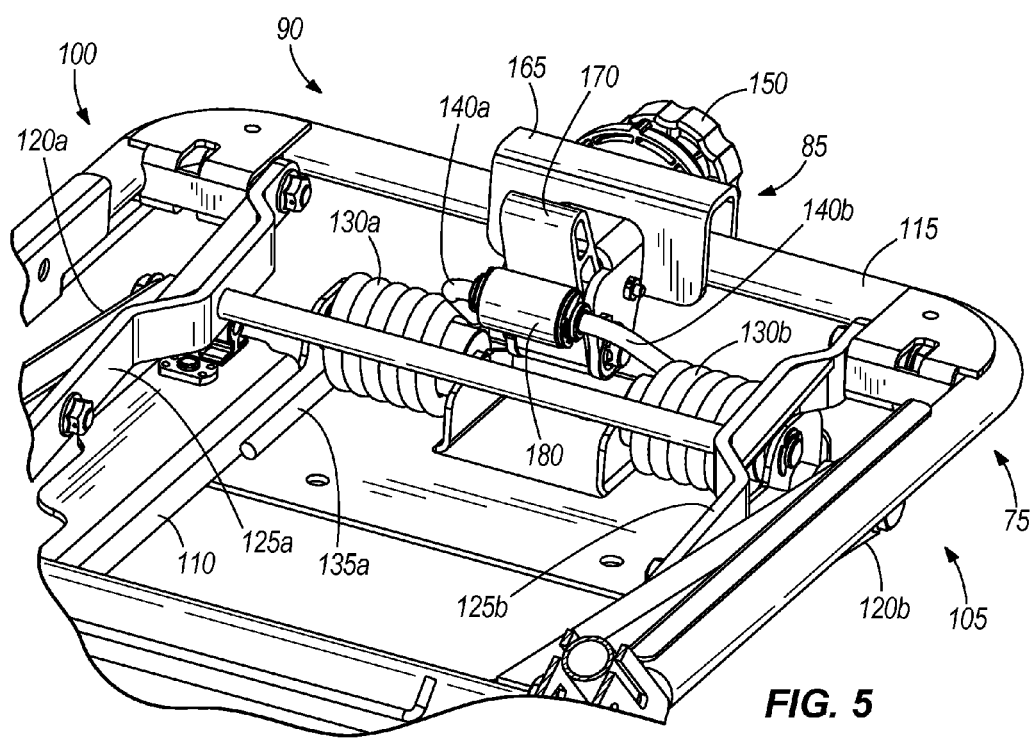
FIG. 5 is a second side perspective view of the adjustment mechanism for the seat assembly.

With reference to FIG. 3, the bottom frame assembly 75 includes a front portion 90, a rear portion 95, a left side portion 100, a right side portion 105, a lower support frame 110, an upper support frame 115, a first suspension arm 120a, a second suspension arm 120b, a third suspension arm 125a, a fourth suspension arm 125b, a first torsion spring 130a (FIG. 5), and a second torsion spring 130b (FIGS. 4 and 5). The terms "front," "rear," "left," and "right" are from the perspective of an operator seated in the seat 30 during normal use of the vehicle 10. A "front portion" of the seat 30 is the portion closer to the front portion 90 of the bottom frame assembly 75 than to the rear portion 95, and a "rear portion" of the seat 30 is the portion closer to the rear portion 95 of the bottom frame assembly 75 than to the front portion 90.

The left side portion 100 and right side portion 105 extend between the front portion 90 and the rear portion 95. The lower support frame 110 is coupled to the chassis 15 and the upper support frame 115 supports the bottom cushion 70.

The first and second suspension arms 120a, 120b are pivotably coupled at one end to the lower support frame 110 in the front portion 90, and are pivotably coupled at an opposite end to the upper support frame 115 in the rear portion 95. The pivotable interconnections of the ends of the first and second suspension arms 120a, 120b are fixed, which is to say that the pivot point for each end does not move with respect to the frame to which it is mounted. The first suspension arm 120a is positioned on the left side portion 100 and the second suspension arm 120b is positioned on the right side portion 105. The first suspension arm 120a is substantially a mirror image of the second suspension arm 120b.

The third and fourth suspension arms 125a, 125b are coupled at one end to the lower support frame 110 in the rear portion 95, and are coupled at an opposite end to the upper support frame 115 in the front portion 90. The interconnections between the third and fourth suspension arms 125a, 125b and the lower and upper frame assemblies 110, 115 are movable pivots, which is to say that the pivot point for each end of the third and fourth suspension arms 125a, 125b can move (in the illustrated embodiment such movement being translational) with respect to the frame to which it is mounted.

The third suspension arm 125a is positioned on the left side portion 100 and the fourth suspension arm 125b is positioned on the right side portion 105. The third suspension arm 125a is substantially a mirror image of the fourth suspension arm 125b.

The first suspension arm 120a is coupled to the third suspension arm 125a and the second suspension arm 120b is coupled to the fourth suspension arm 125b to form a scissor suspension arrangement. The upper support frame 115 is vertically moveable with respect to the lower support frame 110 in response to the suspension arms 120a, 120b, 125a, 125b pivoting with respect to the lower and upper support frames 110, 115. As the scissor suspension arrangement is actuated, the pivot point that interconnects the first and third suspension arms 120a, 125a and the pivot point that interconnects the second and fourth suspension arms 120b, 125b moves generally up and down. In this regard, the suspension arms can be said to be coupled at a moving pivot point.

The upper support frame 115 is vertically moveable with respect to the lower support frame 110 in response to the first and second suspension arms 120a, 120b pivoting with respect to the lower and upper support frames 110, 115 and in response to the third and fourth suspension arms 125a, 125b pivoting and translating with respect to the lower and upper support frames 110, 115.

As the upper support frame 115 moves up and down with respect to the lower support frame 110, the first and second suspension arms 120a, 120b pivot with respect to the lower and upper support frames 110, 115, and the third and fourth suspension arms 125a, 125b pivot about and translate along the lower and upper support frames 110, 115. The third suspension arm 125a rotates with respect to the first suspension arm 120a and the fourth suspension arm 125b rotates with respect to the second suspension arm 120b.

In some embodiments, the upper support frame 115 is moveable between about two and about four inches with respect to the lower support frame 110 (e.g., the seat has a stroke of between 2 inches and 4 inches). In some embodiments, the upper support frame 115 is moveable about three inches with respect to the lower support frame 110 (e.g., the seat has a stroke of 3 inches). The illustrated seat 30 is a low-profile suspension seat that has a seating index point of about eight inches measured per SAE J1163 SPEC.

In some embodiments, the seat 30 can be positioned in a vehicle (such as a truck) in which the upper support frame 115 is moveable between about four inches and about eight inches with respect to the lower support frame 110 (e.g., the seat has a stroke of between 4 inches and 8 inches). In some embodiments, the upper support frame 115 is moveable about six inches with respect to the lower support frame 110 (e.g., the seat has a stroke of about 6 inches).

With reference to FIGS. 4 and 5, the first and second torsion springs 130a, 130b each include a first end 135a, 135b having a first length, a second end 140a, 140b having a second length, and a coil defining a coil axis and extending between the first and second ends 135a, 135b and 140a, 140b. The first and second torsion springs 130a, 130b are coupled to the lower support frame 110 and the first ends 135a, 135b bear against a bearing surface on the lower support frame 110. Although torsion springs are included in the illustrated embodiment, other biasing members can be utilized in place of the torsion springs.

Figure 6:
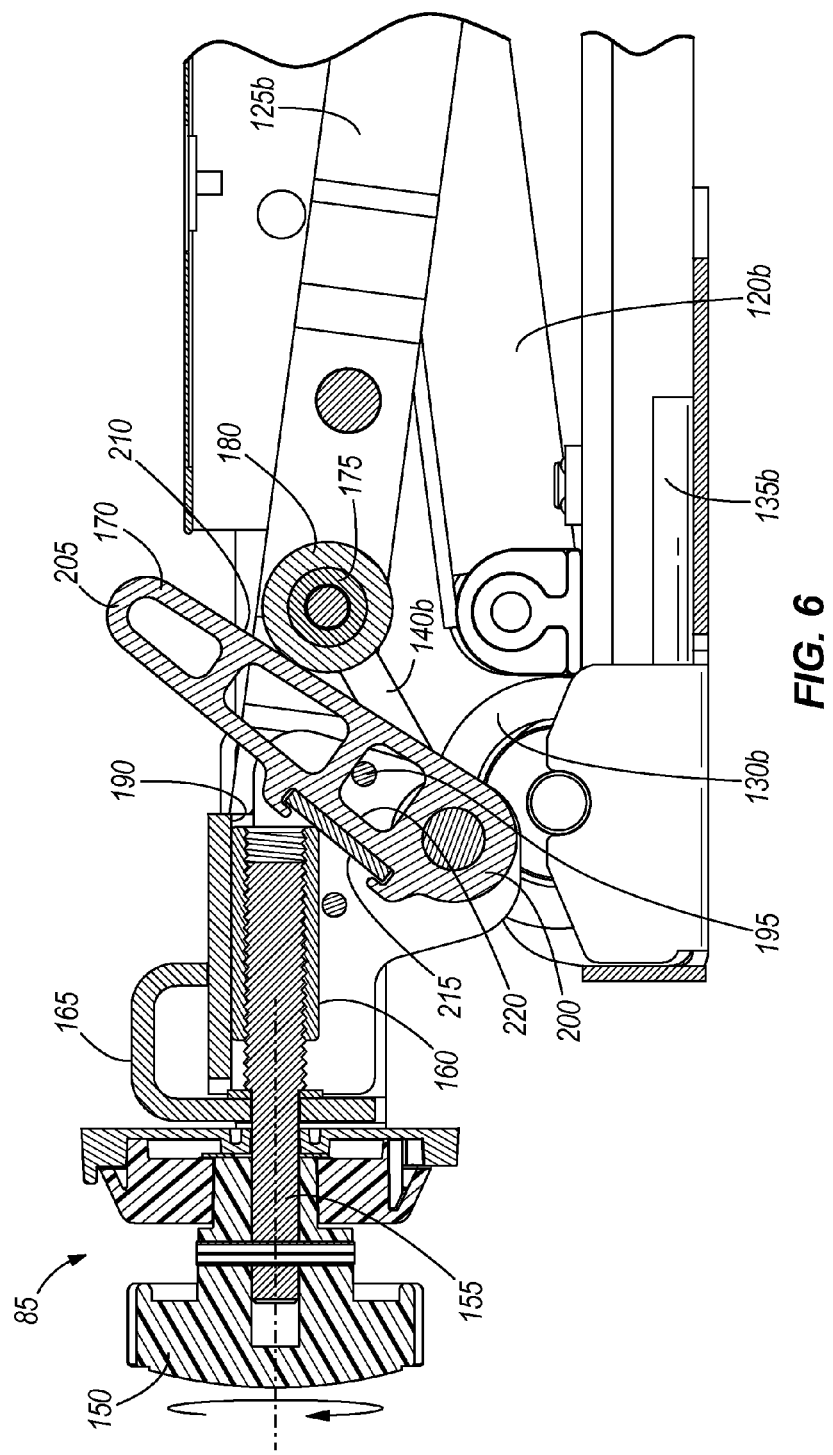
FIG. 6 is a cross-section view taken along line 6-6 of FIG. 3 showing the adjustment mechanism of the seat in a first position.

With reference to FIGS. 4-6, the adjustment assembly 85 includes a handle 150, a threaded shaft 155, a coupling nut 160, a housing 165, a lever 170, a splice tube 175, and a roller 180. The handle 150, the threaded shaft 155 and the coupling nut 160 together form a user actuable control. The handle 150 is positioned proximate the front portion 90 of the seat 30, to permit a user to grasp the handle 150 while sitting in the seat 30. In this regard, the handle 150 may be said to be in the operator zone. The handle 150 is coupled to the threaded shaft 155 for rotation with the threaded shaft 155.

The housing 165 includes a bearing surface 190 that bears against a flat surface of the coupling nut 160 to inhibit rotation of the coupling nut 160 with respect to the housing 165. Rotation of the handle 150 and the threaded shaft 155 causes the coupling nut 160 to move linearly, which in the illustrated embodiment is also laterally (left and right in FIG. 6). The handle 150 includes a shoulder that inhibits movement of handle 150 toward the lever 170 and a washer is coupled to the threaded shaft 155 between the threads and the housing 165 to inhibit movement of the handle 150 away from the lever 170. Therefore, the handle 150 is retained in substantially the same location with respect to the seat 30, so that a user has consistent access to grasp the handle 150. Since the handle 150 is inhibited from lateral movement by the shoulder and the washer, rotation of the handle 150 causes lateral movement of the coupling nut 160 along the threaded shaft 155. The threaded shaft 155 and coupling nut 160 have coarse threads to linearly move the coupling nut 160 more rapidly than would be possible with fine threads. This increases or maximizes the linear travel of the coupling nut 160 per rotation of the handle 150. While the rotatable handle 150 is illustrated, other suitable user actuable controls can be utilized to pivot the lever 170 with respect to the housing 165.

The housing 165 further includes a stop 195 that limits rotation of the lever 170 to a desired range of rotation. The stop 195 can take on any suitable form, but the illustrated stop is a substantially cylindrical projection extending through a portion of the lever 170.

The lever 170 is positioned between the coupling nut 160 and the roller 180 (i.e., the coupling nut 160 bears on one side of the lever 170 and the roller 180 bears on an opposite side of the lever 170). The lever 170 includes a first end 200, a second end 205, a bearing surface 210, a bearing plate 215 and an aperture 220. The first end 200 is coupled to the housing 165 for rotation about the housing 165. The second end 205 is spaced from the first end 200 and is free to move with respect to the housing 165.

The bearing surface 210 is positioned between the first end 200 and the second end 205 of the lever. The bearing surface 210 abuts the roller 180 and bears against the roller 180. The second ends 140a, 140b of the torsion springs 130a, 130b bias the roller 180 against the bearing surface 210. In the illustrated embodiment, the bearing surface 210 is an integral part of the lever 170. In other embodiments, a separate component is coupled to the lever 170 to form the bearing surface.

The bearing plate 215 is coupled to the lever 170 between the first end 200 and the second end 205 of the lever 170. The bearing plate 215 is positioned to abut the coupling nut 160. In the illustrated embodiment, the bearing plate 215 is metallic and the lever 170 is plastic. However, other materials or combinations of materials can be utilized in other embodiments.

The aperture 220 receives the stop 195 of the housing 165. The aperture 220 permits rotation of the lever 170 within a range of angles with respect to the housing 165 and inhibits rotation of the lever 170 outside the range of angles with respect to the housing 165. In FIG. 6, the lever 170 is in an intermediate position within the range of angles.

Figure 7:
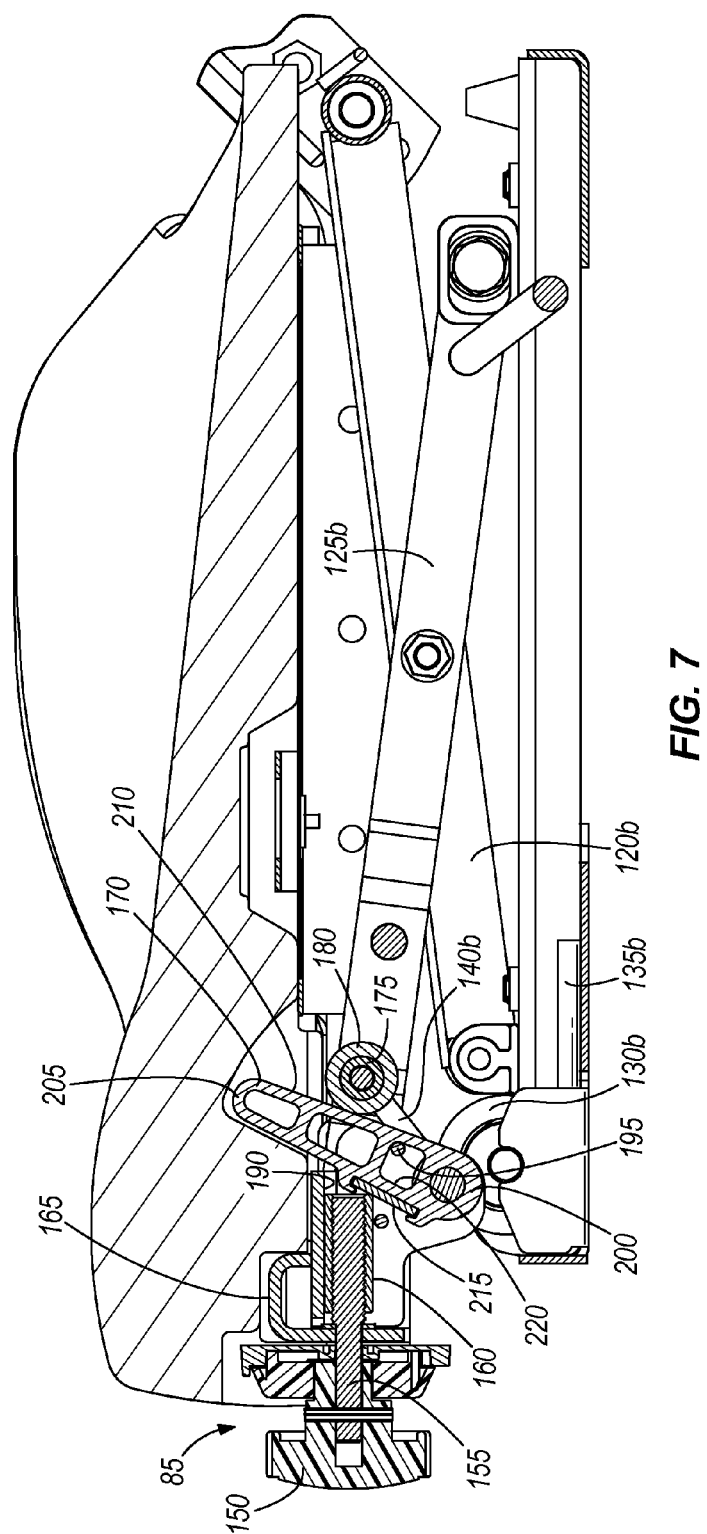
FIG. 7 is cross-section view taken along line 7-7 of FIG. 2 showing the adjustment mechanism of the seat in a second position.

In FIG. 7, the lever 170 is in a first end position defining a first end of the range of angles. In the illustrated embodiment, the lever 170 is positioned at about 70 degrees with respect to the horizontal in the first end position. In other embodiments, the lever 170 can be positioned at about 90 degrees with respect to horizontal in the first end position. When the lever 170 is in the first end position, the stop 195 is at a first end of the aperture 220.

Figure 8:
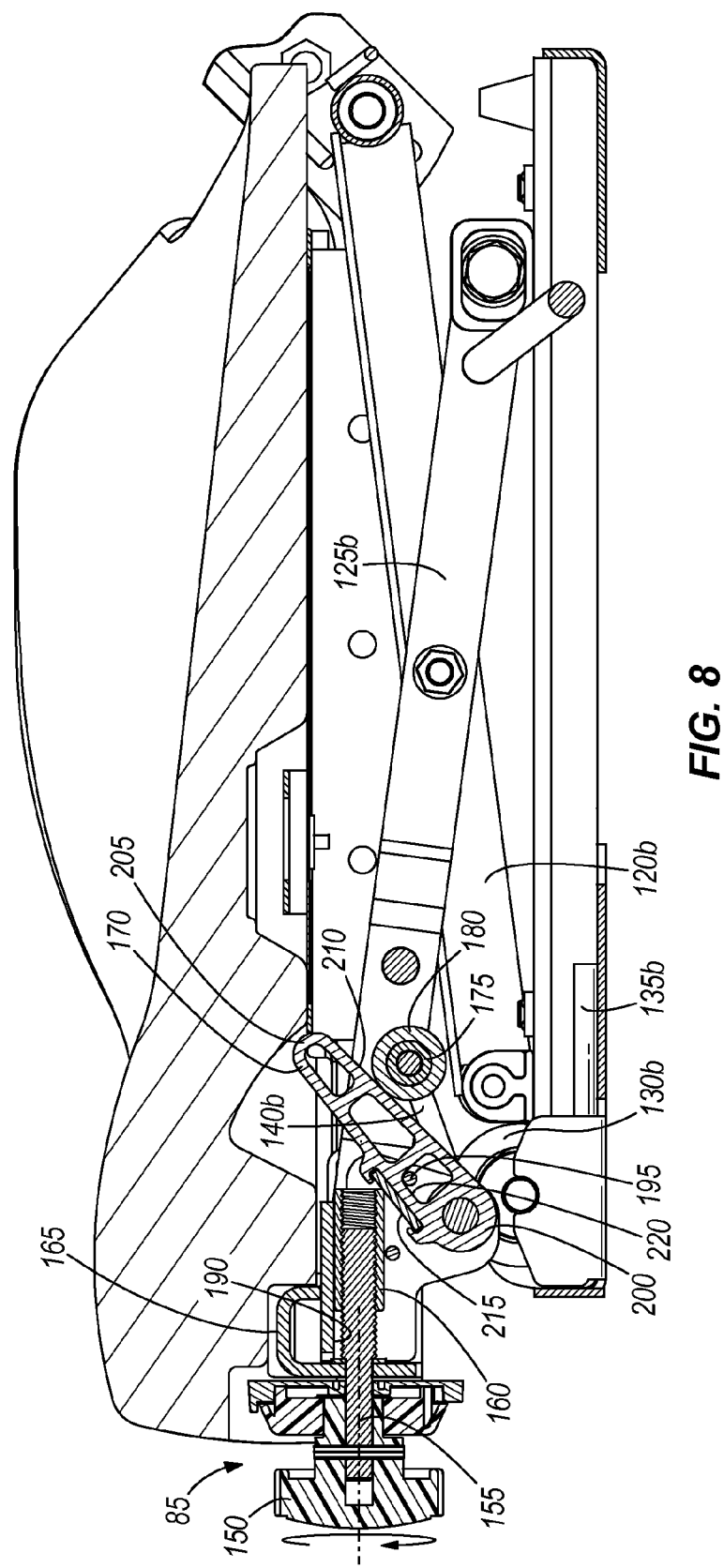
FIG. 8 is similar to FIG. 7 but showing the adjustment mechanism of the seat in a third position.

In FIG. 8, the lever 170 is in a second end position defining a second end of the range of angles. In the illustrated embodiment, the lever 170 is positioned at about 45 degrees with respect to the horizontal in the second end position. In other embodiments, the lever 170 can be positioned at about 25 degrees with respect to horizontal. When the lever 170 is in the second end position, the stop 195 is at a second end of the aperture 220. Other angles and ranges of angles are possible and the illustrated embodiment is given by way of example only.

The springs 130a, 130b apply force to the lever 170, which biases the lever 170 to pivot in the counterclockwise direction as viewed in FIGS. 6-8 and which corresponds to upward movement of the upper support frame 115. The lever 170 is biased against the coupling nut 160 by the springs 130a, 130b. The coupling nut 160 inhibits movement of the lever 170 beyond a pre-determined angle within a range of angles.

As the angle of the lever 170 changes, the component of the force acting on the roller 180 and the torsion spring second ends 140a, 140b changes for a given downward displacement of the upper support frame 115. As with all torsion springs, the relevant component of the force is the normal force (e.g. the force that is perpendicular to the second ends 140a, 140b of the torsion springs 130a, 130b). As shown in FIG. 9, the roller 180 exerts a first force $F_1$ on the lever 170. The first force $F_1$ has a horizontal component $F_{1x}$ as well as a vertical component $F_{1y}$. The horizontal component $F_{1x}$ presses the lever 170 against the coupling nut 160. The relevant component is the vertical component $F_{1y}$ because the vertical component $F_{1y}$ biases the upper support frame 115 away from the lower support frame 110. The first force $F_1$ extends at a first angle with respect to vertical.

As shown in FIG. 10, the roller 180 exerts a second force $F_2$ on the lever 170. The second force $F_2$ has a horizontal component $F_{2x}$ as well as a vertical component $F_{2y}$. The horizontal component $F_{2x}$ presses the lever 170 against the coupling nut 160. The relevant component is the vertical component $F_{2y}$ because the vertical component $F_{2y}$ biases the upper support frame 115 away from the lower support frame 110. The second force $F_2$ extends at a second angle with respect to vertical. The second angle is less than the first angle. As the angle between the force of the roller 180 acting on the lever 170 approaches vertical, a greater component of the force acts in the vertical direction. Therefore, not only is the second force $F_2$ greater than the first force $F_1$ because of the increased loading of the torsion springs 130a, 130b, but the vertical component $F_{2y}$ is also a greater portion of the second force $F_2$, because the angle between the second force $F_2$ and vertical is smaller than the angle between the first force $F_1$ and vertical.

Figure 11:
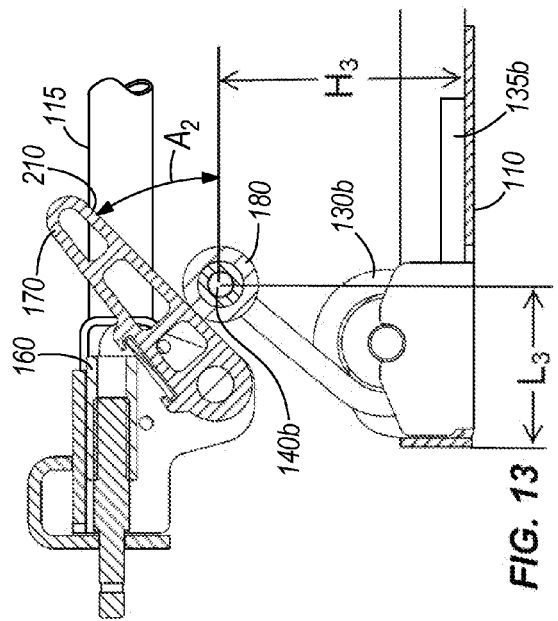
FIG. 11 is a view similar to FIG. 9 with the seat in a first position
Figure 12:
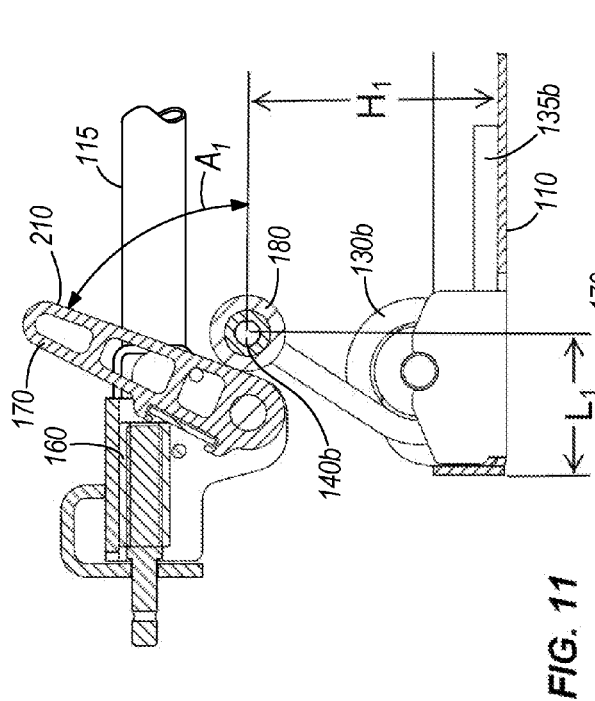
FIG. 12 is a view similar to FIG. 9 with the seat in a second position.

FIGS. 11 and 12 illustrate the lever 170 in the first end position (corresponding to the coupling nut 160 having fully traveled to one end of its range of motion), in which the bearing surface 210 is at an angle $A_1$ of about 70 degrees with respect to horizontal in the illustrated embodiment. FIG. 11 illustrates the upper support frame 115 in a topped-out position in which the upper support frame 115 is spaced a maximum distance from the lower support frame 110. When the lever 170 is in the first end position and the upper support frame 115 is in the topped-out position, the torsion spring ends 140a, 140b are positioned a first height $H_1$ above the lower support frame 110 and a first length $L_1$ from a rear portion of the lower support frame 110. As the upper support frame 115 moves toward the lower support frame 110 into the bottomed-out position, the roller 180 rolls along the bearing surface 210 of the lever 170 into the position illustrated in FIG. 12. When the lever 170 is in the first end position and the upper support frame 115 is in the bottomed-out position, the torsion spring ends 140a, 140b are positioned at a second height $H_2$ above the lower support frame 110 and a second length $L_2$ from a rear portion of the lower support frame 110. The second length $L_2$ is greater than the first length $L_1$ whereas the second height $H_2$ is less than the first height $H_1$. As the roller 180 rolls along the lever 170, the torsion springs 130a, 130b load up (increase in force), and resist further downward movement of the upper support frame 115 with respect to the lower support frame 110.

Figure 13:
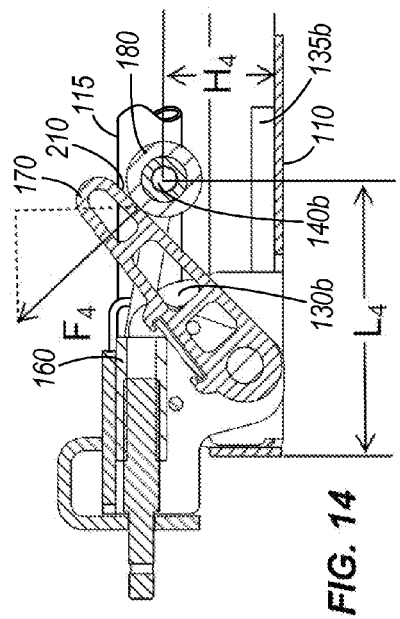
FIG. 13 is a view similar to FIG. 10 with the seat in a third position.
Figure 14:
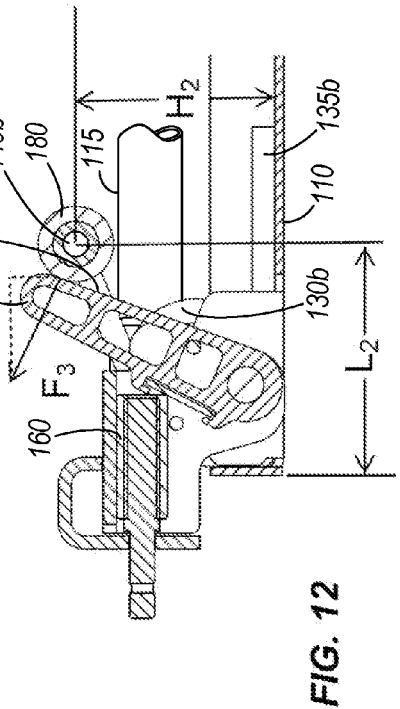
FIG. 14 is a view similar to FIG. 10 with the seat in a fourth position.

FIGS. 13 and 14 illustrate the lever 170 in the second end position (corresponding to the coupling nut 160 having fully traveled to an opposite end of its range of motion), in which the bearing surface 210 is at an angle $A_2$ of about 45 degrees with respect to horizontal in the illustrated embodiment. FIG. 13 illustrates the upper support frame 115 in a topped-out position in which the upper support frame 115 is spaced a maximum distance from the lower support frame 110. When the lever 170 is in the second end position and the upper support frame 115 is in the topped-out position, the torsion spring ends 140a, 140b are positioned a third height $H_3$ above the lower support frame 110 and a third length $L_3$ from a rear portion of the lower support frame 110. As the upper support frame 115 moves toward the lower support frame 110 into the bottomed-out position, the roller 180 rolls along the bearing surface 210 of the lever 170 into the position illustrated in FIG. 14. When the lever 170 is in the second end position and the upper support frame 115 is in the bottomed-out position, the torsion spring ends 140a, 140b are positioned at a fourth height $H_4$ above the lower support frame 110 and a fourth length $L_4$ from a rear portion of the lower support frame 110. The fourth length $L_4$ is greater than the third length $L_3$ whereas the fourth height $H_4$ is less than the third height $H_3$. As the roller 180 rolls along the lever 170, the torsion springs 130a, 130b load up (increase in force), and resist further downward movement of the upper support frame 115 with respect to the lower support frame 110.

The difference between the first height $H_1$ and the second height $H_2$ is less than the difference between the third height $H_3$ and the fourth height $H_4$. The forces $F_3$ and $F_4$ exerted on the lever 170 by the roller 180 are shown in FIGS. 12 and 14. The force $F_4$ in FIG. 14 has a larger vertical component than the force $F_3$ in FIG. 12 for two reasons. The first reason is that the force $F_4$ is oriented as a smaller angle with respect to vertical than the force $F_3$. The second reason is that the torsion springs 130a, 130b have been deflected over a greater angle in FIG. 14 than in FIG. 12.

The stiffness of the suspension correlates to the force required to overcome the bias of the springs 130a, 130b. The greater the force that is required to overcome the bias of the springs 130a, 130b, the stiffer the suspension. Consequently, the suspension becomes stiffer as the relevant component of force increases and becomes softer as the relevant component of force decreases. A soft suspension (such as the suspension illustrated in FIGS. 11 and 12) results in the upper support frame 115 and bottom cushion 70 moving a first vertical distance in response to a weight being applied. A hard suspension (such as the suspension illustrated in FIGS. 13 and 14) results in the upper support frame 115 and bottom cushion 70 moving a second vertical distance, which is less than the first vertical distance, in response to the same weight being applied.

In order to adjust the stiffness of the suspension system, the user rotates the handle 150 to rotate the threaded shaft 155, which moves the coupling nut 160 in a horizontal direction. As the coupling nut 160 moves in a horizontal direction, the coupling nut 160 causes rotation of the lever 170 to thereby change the angle of the lever 170 with respect to the horizontal. As the angle of the lever 170 changes, the degrees of deflection of the first and second ends 135a, 135b, 140a, 140b of the torsion springs 130a, 130b changes, which changes the force the torsion springs 130a, 130b exert on the lever 170. As the angle of the lever 170 changes, the portion of the force acting in the vertical direction (e.g., the vertical component of the force) changes. The vertical components of the forces $F_3$, $F_4$ are the components which bias the upper support frame 115 away from the lower support frame 110.

The angular deflection of the torsion spring second ends 140a, 140b depends at least in part upon the angle at which a force is applied to the second ends 140a, 140b of the torsion springs 130a, 130b. As the angle at which the force is applied to the second ends 140a, 140b approaches vertical, the relevant (vertical) component of the force is a greater portion of the force. The changing vertical component of force means that the degrees of rotation of the torsion spring second ends 140a, 140b per inch movement of the coupling nut 160 changes, as the lever 170 rotates. Specifically, when the lever 170 is in the first end position (shown in FIGS. 7, 9, 11 and 12), the degrees of rotation of the torsion spring second ends 140a, 140b per inch of movement of the coupling nut 160 is relatively low. When the lever 170 is in the second end position (shown in FIGS. 8, 10, 13 and 14), the degrees of rotation of the torsion spring second ends 140a, 140b per inch of movement of the coupling nut 160 is relatively high.

In operation, as the vehicle 10 travels over uneven ground, the upper support frame 115 is permitted to move with respect to the lower support frame 110 because the first and second suspension arms 120a, 120b are permitted to rotate with respect to the upper and lower support frames 115, 110, and the third and fourth suspension arms 125a, 125b are permitted to rotate and translation with respect to the upper and lower support frames 115, 110. The torsion springs 130a and 130b bias the upper support frame 115 away from the lower support frame 110 and the weight of the user biases the upper support frame 115 towards the lower support frame 110.

Movement of the suspension is also affected by the actual weight of a given user sitting on the seat 30. Regardless of the suspension setting, the resistance to downward movement increases as the seat 30 moves downward. Specifically, as the seat 30 moves downward, the torsion springs 130a, 130b load up (increase in force), resulting in greater resistance to further downward movement of the seat 30 to inhibit the seat 30 from bottoming out.

In some embodiments, the torsion springs 130a, 130b are not pre-loaded or are not substantially pre-loaded during adjustment of the coupling nut 160 when the upper support frame 115 is in the topped-out position. This permits a user to more easily adjust the stiffness of the seat suspension than was previously possible with other designs.

In some embodiments, the lever is adjustable by a user to pre-set "positions". For example, the adjustment knob is omitted and the lever is able to be pinned into a soft, medium, or heavy ride setting without the ability to infinitely adjust the firmness of the ride.

In some embodiments, there is no adjustment and the springs bear against an angled top-plate that is preset to an "average" firmness setting.

In some embodiments, the profile of the lever allows for a non-linear suspension rate.

Various features and advantages of the invention are set forth in the following claims.

What is claimed is:

1. A support assembly comprising:
a first support frame including a first bearing surface;
a second support frame spaced a vertical distance from the first support frame;
a suspension including a plurality of suspension arms coupled at a first end to the first support frame and coupled at a second end to the second support frame;
a biasing member coupled to the first support frame and having a first end and a second end, the first end bearing against the first bearing surface;
a lever coupled to the second support frame at a lever first end and pivotable with respect to the second support frame, the lever having a second bearing surface, the second end of the biasing member bearing against the second bearing surface; and
a user actuable control coupled to the lever to adjust the angle of the lever with respect to horizontal upon actuation of the user actuable control,
wherein the second end of the biasing member moves along the second bearing surface as the first support frame moves with respect to the second support frame,
wherein the lever is pivotable between a first position in which the lever is at a first angle with respect to horizontal, and a second position in which the lever is at a second angle with respect to horizontal,
wherein when the lever is in the first position, the first end of the biasing member is moveable along the lever at the first angle with respect to horizontal between a first upper position and a first lower position, wherein the first upper position is spaced a first horizontal distance and a first vertical distance away from the first lower position, the biasing member is deflected a first distance between the first upper position and the first lower position,
wherein when the lever is in the second position, the first end of the biasing member is moveable along the lever at the second angle with respect to horizontal between a second upper position and a second lower position, wherein the second upper position is spaced a second horizontal distance and a second vertical distance away from the second lower position, the biasing member is deflected a second distance between the second upper position and the second lower position, and
wherein the first angle is greater than the second angle and the second deflection is greater than the first deflection.

2. The support assembly of claim 1, wherein the biasing member includes at least one torsion spring having a first end bearing against the first bearing surface and a second end bearing against the second bearing surface, and wherein deflection of the biasing member is measured as angular displacement of the second end with respect to the first end.

3. The support assembly of claim 2, further comprising a roller coupled to the second end of the torsion spring, wherein the roller rolls along the second bearing surface of the lever.

4. The support assembly of claim 1, wherein the user actuable control is mounted to the second support frame, and includes a handle, a threaded shaft, and a coupling nut, wherein upon rotation of the handle, the threaded shaft moves the coupling nut substantially horizontally, and the coupling nut bears against the lever to pivot the lever between the first position and the second position.

5. The support assembly of claim 1, wherein the suspension permits the second support frame to move between about two and about four inches with respect to the first support frame and wherein the suspension is operable to support a seat that has a seating index point of about eight inches.

6. The support assembly of claim 1, wherein the suspension permits the second support frame to move about three inches with respect to the first support frame and wherein the suspension is operable to support a seat that has a seating index point of about eight inches.

7. The support assembly of claim 1, wherein when the lever is in the first position, the suspension is softer than when the lever is in the second position.

8. The support assembly of claim 1, wherein when the lever is in the first position, a first weight moves the second support frame a first height with respect to the first support frame, wherein when the lever is in the second position, a second weight move the second support frame the first height with respect to the first support frame, and wherein the second weight is greater than the first weight.

9. The support assembly of claim 1, wherein the lever is pivotable within a range of angles with respect to horizontal, wherein the range of angles is between about 25 degrees and about 90 degrees.

10. The support assembly of claim 9, wherein the range of angles is between about 45 degrees and about 70 degrees.

11. A support assembly comprising:
a first support frame including a first bearing surface;
a second support frame spaced a vertical distance from the first support frame;
a torsion spring coupled to the first support frame and having a first end and a second end, the first end bearing against the first bearing surface; and
an adjustment assembly coupled to the second support frame and adjustable with respect to the second support frame, the second end of the torsion spring bearing against the adjustment assembly.

12. The support assembly of claim 11, further comprising a suspension including a plurality of suspension arms coupled at a first end to the first support frame and coupled at a second end to the second support frame, the plurality of suspension arms supporting the second support frame at a vertical distance from the first support frame.

13. The support assembly of claim 11, wherein the torsion spring has a first arm bearing against the first bearing surface and a second arm bearing against the adjustment assembly, and wherein deflection of the torsion spring is measured as angular displacement of the second arm with respect to the first arm.

14. A support assembly comprising:
a first support frame including a first bearing surface;
a second support frame spaced a vertical distance from the first support frame;
a biasing member coupled to the first support frame and having a first end and a second end, the first end bearing against the first bearing surface; and
an adjustment assembly coupled to the second support frame and adjustable with respect to the second support frame, the second end of the biasing member bearing against the adjustment assembly,
wherein the adjustment assembly comprises a user actuable control, a lever and a roller, wherein the user actuable control is laterally moveable and bears against the lever to pivot the lever within a range of angles with respect to vertical, and wherein the roller is coupled to the biasing member.

15. The support assembly of claim 14, wherein the roller bears against the lever and rolls along the lever to deflect the biasing member, wherein deflection of the biasing member over a distance of travel along the lever is determined in part by the angle of the lever with respect to vertical.

16. The support assembly of claim 14, wherein the user actuable control is mounted to the second support frame, and includes a handle, a threaded shaft, and a coupling nut, wherein upon rotation of the handle, the threaded shaft moves the coupling nut substantially horizontally, and the coupling nut bears against the lever to pivot the lever between a first end position in which the lever extends at a first angle with respect to vertical and a second end position in which the lever extends at a second angle with respect to horizontal.

17. The support assembly of claim 16, wherein the first angle is greater than the second angle, and wherein when the lever is in the first end position, the suspension is softer than when the lever is in the second end position.

18. The support assembly of claim 17, wherein when the lever is in the first position, a first weight moves the second support frame a first distance with respect to the first support frame, wherein when the lever is in the second position, a second weight moves the second support frame the first distance with respect to the first support frame, and wherein the second weight is greater than the first weight.

19. The support assembly of claim 14, wherein the lever is pivotable within a range of angles with respect to horizontal, wherein the range of angles is between about 25 degrees and about 90 degrees.

20. The support assembly of claim 19, wherein the range of angles is between about 45 degrees and about 70 degrees.

\* \* \* \* \*